United States Patent
Frost et al.

(10) Patent No.: US 10,292,020 B2
(45) Date of Patent: May 14, 2019

(54) MANAGING COMMUNICATION RESOURCES

(71) Applicant: VODAFONE IP LICENSING LIMITED, Newbury, Berkshire (GB)

(72) Inventors: Tim Frost, Newbury (GB); Chris Pudney, Newbury (GB); Alexej Kulakov, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 51 days.

(21) Appl. No.: 15/513,822

(22) PCT Filed: Sep. 24, 2015

(86) PCT No.: PCT/GB2015/052777
§ 371 (c)(1),
(2) Date: Mar. 23, 2017

(87) PCT Pub. No.: WO2016/046563
PCT Pub. Date: Mar. 31, 2016

(65) Prior Publication Data
US 2017/0251341 A1    Aug. 31, 2017

(30) Foreign Application Priority Data

Sep. 24, 2014  (GB) .................................. 1416875.1
Sep. 29, 2014  (GB) .................................. 1417173.0
(Continued)

(51) Int. Cl.
*H04W 4/00*  (2018.01)
*H04W 4/06*  (2009.01)
(Continued)

(52) U.S. Cl.
CPC ............. *H04W 4/06* (2013.01); *H04L 12/189* (2013.01); *H04W 4/08* (2013.01); *H04W 28/0289* (2013.01); *H04W 72/005* (2013.01)

(58) Field of Classification Search
CPC ....... H04W 4/06; H04W 4/08; H04W 72/005; H04W 28/0289; H04L 12/189
(Continued)

(56) References Cited

U.S. PATENT DOCUMENTS

2006/0047845 A1*  3/2006  Whited ............. H04L 29/06027
                                                      709/231
2007/0177592 A1*  8/2007  Mooney ................. H04L 12/18
                                                       370/390
(Continued)

FOREIGN PATENT DOCUMENTS

EP   1542395 A1   6/2005
EP   2829089 A1   1/2015
WO   2013182247   12/2013

OTHER PUBLICATIONS

Search Report issued in GB1416875.1 dated Feb. 19, 2015.
International Search Report and Written Opinion issued in PCT/GB2015/052777 dated Dec. 9, 2015.

*Primary Examiner* — Mang Hang Yeung
(74) *Attorney, Agent, or Firm* — Workman Nydegger (57) ABSTRACT

Method and system for managing communication resources within a cellular network. The method comprising determining one or more groups of user equipment, UEs, engaged in a group call in a first mode of operation to be migrated to a second mode of operation based on information indicating the load of a base station. Sending a message indicating that the determined one or more groups of UEs are to migrate to the second mode of operation.

14 Claims, 5 Drawing Sheets

(30) Foreign Application Priority Data

Oct. 20, 2014 (GB) .................................. 1418618.3
Oct. 30, 2014 (GB) .................................. 1419351.0

(51) Int. Cl.
*H04W 72/00* (2009.01)
*H04L 12/18* (2006.01)
*H04W 4/08* (2009.01)
*H04W 28/02* (2009.01)

(58) Field of Classification Search
USPC ........................................................ 370/329
See application file for complete search history.

(56) References Cited

U.S. PATENT DOCUMENTS

| | | | |
|---|---|---|---|
| 2012/0263089 A1 | 10/2012 | Gupta et al. | |
| 2013/0024582 A1 | 1/2013 | Rodrigue | |
| 2013/0182247 A1 | 7/2013 | Ericsson | |
| 2013/0194999 A1* | 8/2013 | Anchan .................. | H04W 4/06 370/312 |
| 2014/0194100 A1* | 7/2014 | Anchan ............... | H04W 76/005 455/416 |
| 2014/0254456 A1 | 9/2014 | Roh | |
| 2015/0078245 A1* | 3/2015 | Anchan ................ | H04M 13/00 370/312 |

\* cited by examiner

MANAGING COMMUNICATION RESOURCES

CROSS REFERENCE TO RELATED APPLICATIONS

This application is a U.S. Nationalization of PCT Application Number PCT/GB2015/052777, filed on Sep. 24, 2015, which claims priority to GB Patent Application No. 1419351.0 filed on Oct. 30, 2014, GB Patent Application No. 1418618.3 filed on Oct. 20, 2014, GB Patent Application No. 1417173.0 filed on Sep. 29, 2014, and GB Patent Application No. 1416875.1 dated Sep. 24, 2014, the entireties of which are incorporated herein by reference.

FIELD OF THE INVENTION

The present invention relates to a method and system for managing communication resources and in particular to managing congestion within telecommunication networks.

BACKGROUND OF THE INVENTION

LTE is being evolved by 3GPP to be able to handle Mission Critical services for Public Safety operations. One of the new types of service that needs to be handled is the ability for Group communications (and in particular Push To Talk groups) to be operated using LTE networks. Push To Talk communication has low activity by nature, so in order to maximise efficiency of the LTE radio resources, statistical multiplexing of multiple Group Calls can be used to reduce overall radio resource reservation required to handle the Group Call traffic, which in turn allows operator to free up capacity for their consumer broadband and other services. In addition Group Call communications are required to be reliable. For example, police and firemen need to be able to communicate with a high level of reliability.

In addition to this, the nature of Group Calls being Point-To-Multipoint (PTM) means that multiple terminals from the same "talk group" would receive the same data from the same source (data originating from another terminal in the same talk group). A feature called evolved Multimedia Broadcast and Multicast Service (eMBMS) within LTE allows a single data burst to be mapped to the radio resource and transmitted once in a broadcast fashion, such that the same transmitted signal (containing the data) can be received simultaneously by multiple receiving terminals in downlink direction, in order to further optimise the radio resources used.

Another optimisation of eMBMS is that multiple adjacently deployed eNode Bs (deployed to provide a contiguous coverage area) can be synchronised in time, and the eMBMS physical signals can be transmitted or aligned in each eNode B such that a terminal can receive the same signal from multiple eNode Bs nearly simultaneously. This approach is called Single Frequency Network (SFN). The SFN approach both avoids interference at the receiving terminal and increases its Signal-to-Noise Ratio (SNR) of the received eMBMS physical channel. The area over which the same physical signal is sent from multiple eNode Bs simultaneously is called the MBSFN area. In order to ensure that all eNode Bs in an MBSFN area can be coordinated properly, there is a logical node controlling all of them called an MCE.

Given that the usefulness of eMBMS usage depends on a number of terminals all desiring to receive the same data at the same time, a procedure allows the MCE and eNodeB to "count" the number of users interested in the service, and this procedure can be performed periodically. If there are insufficient numbers of terminals interested compared to the radio resource that is being expended in using the eMBMS radio resource, then the users may be switched to "unicast" operation, using a dedicated (point-to-point) channel for each terminal individually within a cell. The mapping process is not a very dynamic process, however, and there is some delay in mapping Group Calls to MBMS physical signals for MBMS reception and switching them back to dedicated channels for unicast operation. The control of this is currently performed by a control channel (at the "RRC" protocol layer) that is sent from the MCE every five seconds to all terminals receiving the MBMS physical signal.

Therefore, the usage of an eMBMS physical signal transmitted in an SFN fashion from multiple eNode Bs in an MBSFN area is an important feature for handling Group Calls. However, given that MBMS resources cannot be reserved with a very fine granularity within a cell and the fact that the level of MBMS resources reserved in the cell cannot be adapted very quickly, multiple Group Calls need to be able to be multiplexed and mapped to the same eMBMS physical signal with the aim to use the reserved resource as effectively as possible. Furthermore, given the low activity factor of Group Calls, and the lack of dynamicity in mapping and de-mapping Group calls to/from MBMS, this leads to a need to rely heavily on statistical multiplexing to estimate the overall MBMS radio resources required.

Furthermore, there is no equivalent of an eMBMS operation in uplink direction, Group Calls transmitting voice or video data would need to use the dedicated (point-to-point) channel in uplink, even if they are receiving voice or video data via the eMBMS physical signals in downlink.

The following text is extracted from 3GPP TS23.468 and 3GPP TS36.440 for further description of the eMBMS architecture for Group Call operation.

Figure 1:
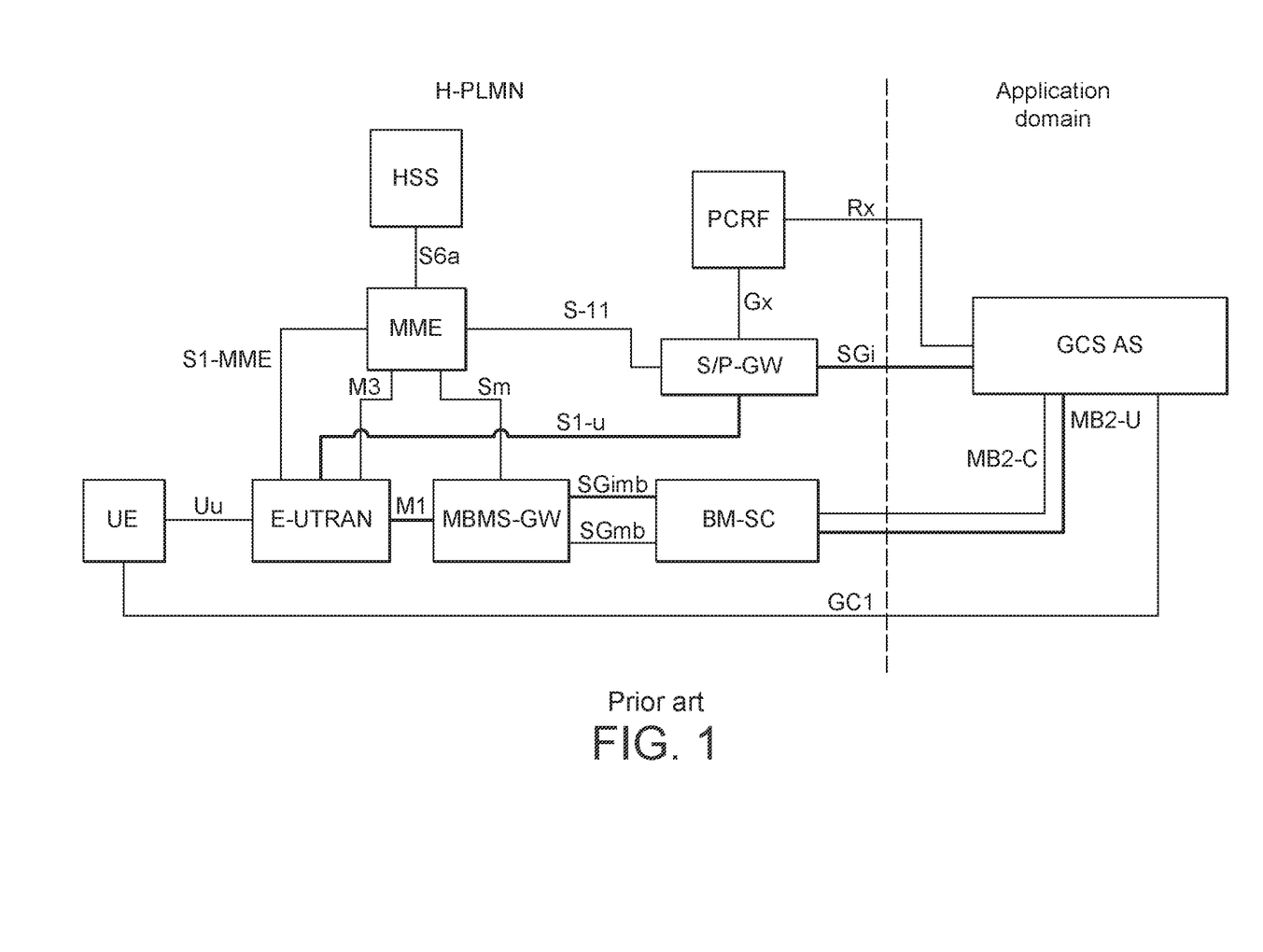
FIG. 1 shows a schematic diagram of a prior art LTE architecture.

FIG. 1 (FIG. 4.2.2-1 from 3GPP TS23.468) shows non-roaming architecture model for GCSE_LTE.

Figure 2:
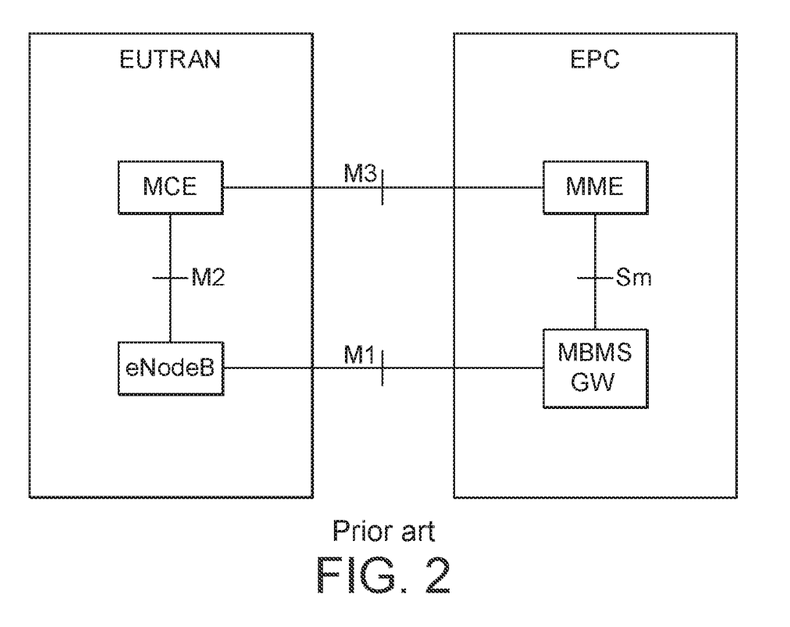
FIG. 2 shows a further schematic diagram of a prior art LTE architecture.

FIG. 2 (FIG. 4-1 from 3GPP TS23.468) shows a simplified architecture for MBMS in LTE/SAE. It consists of EPC functional entities and E-UTRAN nodes. Functions of MBMS EPC entities are defined in TS 23.246. Functions of MBMS E-UTRAN nodes are defined in TS 36.300. It should be noted that TS 36.300 also allows MCE be deployed inside eNode B.

FIG. 2 shows interfaces related to E-UTRAN (i.e. M1, M2 and M3). For MBMS, control signalling and user plane data packet are distributed from the EPC to E-UTRAN through different interfaces.

Control Plane Interfaces:

M3, M2 interface are pure control plane interfaces.

M3 between MME and MCE mainly carries MBMS session management signalling.

A MCE is connected to one or more than one eNode Bs (eNBs) within the same MBSFN through M2 interface mainly for MBMS session management signalling and radio configuration signalling.

User Plane Interface:

M1 interface is a pure user plane interface.

A MBMS GW is connected to multiple eNBs through M1 interface for data distribution.

Reference points within EPC are not in the scope of this document. Please refer to TS 23.246 for details.

Multiple talk groups are typically mapped to MBMS resources in downlink direction and there is the possibility that at any given moment the traffic generated for the active talk groups mapped to the MBMS resource might exceed the capacity of that resource. This is due to the lack of dynamicity of adapting the reserved MBMS resources in the cell, and the lack of dynamicity in switching terminals between unicast and MBMS operation in the cell, and the lack of predictability and accuracy of statistical multiplexing, and the need of LTE operators to try to use their allocated spectrum efficiently. If there are no other MBMS resource "units" available, this might lead to data for one or more "talk group" being discarded by the eNode B prior to transmission over the radio interface, thus not meeting the needs of the service.

Even though MBMS is primarily targeted for talk groups with medium to high numbers of users/terminals within the cell or MBSFN area, the traffic levels generated for these groups may not be typically enough to "fill up" the MBMS resource reserved in the cell, and the lack of granularity of the MBMS resource units reserved means that some of the cell capacity could be wasted. Therefore, a reasonable radio resource management (RRM) mechanism should use the reserved resources more effectively. To enable this, talk groups with low numbers of users in the cell and/or MBSFN area should also be configured to use the MBMS resources that have been reserved even though these groups could also be handled via unicast operation. These talk groups would also be contributing to the traffic loading on the MBMS resource.

Therefore, there is required a method and system that improves the management of the network and the utilisation of communications resources.

SUMMARY OF THE INVENTION

Individual base stations may provide one or more cells to a communications network. A controller coordinates or manages the cells within the network. Groups of User Equipment (UE) may be involved with one or more group calls. These groups may be multicast group calls in which the same data is sent to each UE as a broadcast. Alternatively, point-to-point transmission ("unicast operation") may be used. The controller determines whether particular groups are to use multicast or unicast for their group calls. Part or all of this determination is based on an indication of load of each base station provided to the controller. The controller can determine whether or not to migrate multicast groups to unicast. The controller then issues an instruction or sends a message resulting in one or more groups of UEs migrating to unicast.

Although optionally the controller coordinates or manages cells within the network, in some embodiments the controller may be situated at, and dedicated to, a particular base station. The controller may receive information directly from and relating to that base station. As such, the controller may determine for the given base station whether particular groups of UEs are to use multicast or unicast for group calls, based on the load at that base station.

In some embodiments, further information may be provided to the controller by a particular base station or one or more base stations within the network. This additional information may include data on how many UEs or which particular UEs are within each cell or which groups have data transfer ongoing and/or the data rate of the data transfer, for example. The message or command issued by the controller indicating that particular groups of UEs should migrate to unicast may be in the form of a command to suspend or interrupt a group call, for example. UEs may interpret such a suspension of their call as a hint or instruction to restart the group call in unicast operation. Alternative messages may avoid the suspension or interruption of the call or provide another mechanism for migrating the groups from multicast to unicast.

The controller may also use the information provided by the base station to migrate groups from unicast to multicast. This decision may also be based on the information indicating the load from individual base stations and/or other information on cell usage provided by the base stations. This may be achieved by using a control channel to issue instructions at intervals.

The following scenarios illustrate how management of the system may be improved under when certain network conditions are encountered.

Scenario 1: During occasions where the traffic levels exceed the capacity of the MBMS resource configured, the first step of any RRM mechanism may be to switch the talk groups in the MBMFN area with low numbers of users/terminals back to unicast operation until such a time where the traffic levels generated for traffic mapped to the MBMS resource reduce again.

Scenario 2: In some cases, MBMS resources can also be used by terminals not configured for receiving data via MBMS channels, but this can be only be done if a configured MBMS resource unit is not used at all for MBMS transmission. Therefore, in this type of configuration, it would also be useful for the RRM mechanism to switch groups with few members (e.g. below a predetermined number) in the MBSFN area to unicast once the first MBMS resource unit configured starts to get used up, in order not to partially overflow into the second MBMS resource unit (preventing it to be used for "other" terminals).

However, there is currently no way of using MBMS standard features to ensure that talk groups with low numbers of users get offloaded to unicast when scenario 1 and 2 situations occur, whilst retaining service reliability levels.

In accordance with a first aspect there is provided a method of managing communication resources within a cellular network, the method comprising the steps of:

determining one or more groups of user equipment, UEs, engaged in a group call in a first mode of operation to be migrated to a second mode of operation based on information indicating the load of a base station; and sending a message indicating that the determined one or more groups of UEs are to migrate to the second mode of operation. This allows resources to be managed more effectively as a controller (for example a multicell coordination entity) has more information to use to determine how resources are being used. Optionally, a decision may be taken on whether or not to migrate any groups of UEs at all. This decision may be based on the information indicating the load of the base station. For example, this information may be the current load of the base station (e.g. 85%). The entity making the decision (e.g. a server, controller or MCE) may then compare this actual load against a threshold or other criteria (or otherwise make a calculation) and decide to switch groups of UEs according. In other embodiments the information may be an indication that a load threshold has been breached. Following such an event, switching between modes of operation may always take place and so no explicit decision may be required. However, determining which groups to migrate will still be required to optimise operation.

Determining which groups of UEs to switch may be based on the identity of the originating base station or other information, for example.

Preferably, information indicating the load of a base station may be received from one or more base stations. In a preferred example, the information indicating the load of a base station may be received from a plurality of base stations. For example, the information may be reported or received from any one or more external base stations or eNode.

The message indicating that one or more groups of UEs are to switch mode may take many different forms. The message may go directly to the UEs (e.g. from a controller) or be sent via the base station (e.g. the MCE may instruct the base station to suspend particular groups or bearers. This instruction may include a timestamp of when to send this information to UEs so that this may be coordinated across more than one base station. The instruction may include information suspending particular bearers or groups and whether for each group to move to unicast). Individual UEs (or groups of UEs) may then request to switch mode. This may be through the base station, the controller or to another entity (e.g. an application server), for example.

Optionally, the first mode of operation may be multicast and the second mode of operation may be unicast. The first mode may be unicast and the second mode may be multicast in some embodiments. The controller can move UEs both ways, for example. Moving groups from multicast to unicast has particular advantages.

Optionally, the message indicating (e.g. to the base station) that the determined one or more groups of UEs may be to migrate to the unicast mode of operation is a cessation, suspension or interruption of the group call or termination of the multicast group call. The actual group call may continue but using unicast. This has several advantages. When resources are low then some group calls may fail but the UEs may need to be informed. Users may not know that they are no longer receiving information (e.g. emergency services may be waiting for a command but don't know that the group call has failed). Actively, terminating the call means that the base station may then provide UEs with information that the call is no longer in progress. They can then initiate a new call or resume service via unicast mode. The existing mechanism to inform UEs would be by removing the group call's ID from the eMBMS control channel (e.g. every 5 seconds). However, a new message/mechanism for sending information to all impacted UEs means that this can be faster than using the existing mechanism (e.g. faster than every five seconds). Therefore, a new call or service resumption, in unicast mode may be initiated quicker, meaning reduced disruption to service.

Optionally, the method may further comprise the steps of:
UEs within the one or more groups of UEs receiving the message to migrate to the unicast mode of operation; and
in response to the received message issuing a request to an application server to migrate to the unicast mode of operation. The application server (or group call application server) may be separate to the controller.

Preferably, the base station may be an eNodeB within a Long Term Evolution, LTE, network. Other network types may be used.

Preferably, the groups of UEs may be engaged in a Multimedia Broadcast and Multicast Service, MBMS, group call. Other group calls may be used. Group calls may include voice, data, Push-to-talk or other types.

Optionally, the base station may provide a plurality of cells.

Optionally, the information received from the base station (e.g. at the controller or MCE) may be a load report and may further include the number of UEs per cell.

Preferably, the information indicating the load of the base station may be an indication that a load threshold has been reached. This may be triggered, for example. The threshold may be predetermined.

Advantageously, the information indicating the load of the base station may further include information indicating the utilisation of one or more MBMS resources. The MBMS resource may be a resource reserved from multicast.

Preferably, when the first mode of operation is multicast and the second mode of operation is unicast, the step of determining the one or more groups of UEs engaged in a group call to be migrated to the unicast mode of operation may further comprise the step of determining that the one or more MBMS resource utilisation is above a first threshold and if above the first threshold then migrating one or more groups of UEs to unicast operation. In other embodiments migration may reverse when the load has gone below the first threshold (or another threshold).

Optionally, when UEs within the one or more groups of UEs migrated to unicast mode are capable of using a MBMS resource configured for multicast when no UEs in multicast mode are using that MBMS resource. In other words, some or all UEs (e.g. handsets) may have the capability of using a MBMS multicast resource even for unicast calls. However, this capability can be restricted to the condition that no UEs in multicast operation are using the same MBMS resource as the same time. Under certain circumstances it may be advantageous to migrate a relatively low number of multicast UEs (or groups) from a MBMS resource to free it up for unicast use by such handsets even though those groups may be more suited to multicast operation (there may be a larger number of UEs in the group, for example). For example, if the base station (or eNode B) indicates to the controller (MCE) that all of the UEs of this group are close to the Base Station (e.g. based on knowledge of the pathloss or received RSRP levels from each UE in the cell) then it might be possible for the MCE to decide to push this group to unicast.

Optionally, the first mode of operation is unicast and the second mode of operation is multicast and the step of determining the one or more groups of UEs engaged in a group call to be migrated to the multicast mode of operation may further comprise the step of determining that the one or more MBMS resource utilisation is above a second threshold and if above the second threshold then migrating one or more groups of UEs to multicast operation. Therefore, the system may be optimised to "fill up" a MBMS resource with groups of UEs that wouldn't ordinarily benefit from multicast (they may consist of few UEs, for example). As the MBMS resource is already partly used for multicast then this excludes its use by unicast UEs, which otherwise have to use other mobile network resources. This embodiment improves the utilisation of MBMS resources in multicast operation, whilst freeing up other network resources. In other embodiments migration may reverse when the load has gone below the second threshold (or another threshold).

Optionally, the first mode of operation may be multicast and the second mode of operation may be unicast and the message indicating that the determined one or more groups of UEs are to migrate to the unicast mode of operation may be sent via point-to-multipoint channel, by a Media Access Control (MAC) message, MAC signalling or MAC control element, or via an application packet send on the eMBMS data channel. The message may be sent as a direct command, or may be sent as an indirect command, for example by indicating that the MBMS data transmission is interrupted or suspended. The message may be sent by the base station to each UE, for example. Alternatively, it may be sent via point-to-point means to each UE via e.g. application level (application packet), a new paging record, or a new information field sent on the downlink dedicated control channel (PDCCH in LTE), for example. This message may be sent by including the instruction to change mode (or to just note that transmission has been interrupted) alongside the group id of the group call (or a reference to the group ID of the group call). The UEs in that group may then request to use the unicast mode of operation. Optionally, where the message is a MAC message, MAC control element or MAC signal, the message may be a LTE Multicast Scheduling Information (MSI) MAC message.

Using a MAC control element, for example a MSI MAC message (or another point-to-multipoint signalling approach), may mean that the MCE may need to coordinate when this is sent between different Base Stations. This may require information to be sent from the MCE to the Base Stations indicating timestamp information of when this information should be sent to UEs from each Base Station. In order to assist the MCE in generating a correct timestamp (for when you do the multicast message to the UEs), the MCE may join the IP multicast user plane data distribution group in order to receive the SYNC packets that are also sent to the eNode Bs (the SYNC packets convey time related information to the eNode Bs).

Advantageously, the MAC message or MSI MAC message may comprise two entries relating to each one or more groups of UEs and further wherein the first entry may indicate that there are data scheduled for the group (e.g. TMGI) within a scheduling period and the second entry may indicate that a bearer (e.g. PTM bearer) for the group is suspended from the end of the scheduling period. Suspending the bearer may also indicate that users should migrate to unicast.

Advantageously, the MAC message or MSI MAC message may comprise two entries relating to each one or more groups of UEs. The first entry may indicate that there are data scheduled for the group within a scheduling period and the second entry may indicate that the UEs are to switch to unicast. In other words, the first entry may describe the data or payload and the second entry may indicate that the UEs in a particular group are to migrate or switch to unicast from multicast. This second entry may be a direct command to switch or may be a flag or indirect command that is interpreted as such. For example, the second entry may be an alternative command to do something else or communicate something else, but which may be interpreted by the UEs as a request to switch. Individual UEs within the particular group intended to switch to unicast may request the switch to take place (e.g. to the cellular network) and/or the network will cause the switch or migration to occur.

The UE or groups of UEs may be informed or instructed that they will be switched or migrated to unicast (or requested to do so). However the UE can keep listening to or maintain communication with the MBMS channel while the UE is doing this (migrating). As acquiring the data via unicast may not be instantaneous, beneficially the eNode B may continue to send data on the MBMS channel in the meantime, to allow the communication to "make before break" thereby avoiding service disruption on switching. In other words, the unicast operation may be established before the MBMS data transmission is interrupted or suspended. Therefore, a delay may be introduced between the time that the UE is instructed or informed to go to unicast and the time that the eNode B stops MBMS data transmission.

Optionally, the second entry may indicate that a bearer for the group is suspended or that data transfer on the bearer is interrupted. This is one example of an indirect message for migration to take place. In other words, there is an indication, command or message to do something other than migration specifically, but which may be interpreted as an instruction or indication that migration from multicast to unicast is to take place. Switching or migration from multicast to unicast may be coupled, linked or made dependent (or independent) from the suspension of the bearer.

Preferably, the bearer for the group may be suspended following a period of time. In other words, after receiving an indication that the bearer will be suspended or interrupted, the UEs may remain for a period of time in multicast mode, while at the same time attempting to migrate to unicast. This may give the UEs an opportunity to migrate to unicast without losing connectivity. The command may be interpreted as an indication that the bearer will be suspended in the future (e.g. in 80 ms, 800 ms, 1 s, 5 s, or any time in between), after a predetermined delay, after a predetermined number of scheduling periods (e.g. 1 to 10) or after a time or number of scheduling periods specified in the MSI MAC message entry, for example. The MSI MAC message entry therefore may indicate that the bearer can only be relied upon for a certain period of time (wherein the period of time is predetermined or notified in the message).

Preferably, the cellular network may suspend the bearer for the group. In other words, the cellular network may be the entity that causes the migration from multicast to unicast to take place with or without a request from individual UEs.

Optionally, the method may further comprise the base receiving from the base station information indicating the number of UEs within each one or more groups of UEs.

Advantageously, the number may be indicated per cell of the base station.

Advantageously, the number may be used to determine whether or not to migrate the one or more groups of UEs to the second mode of operation.

Optionally, the method may further comprise the step of sending a time indicator for synchronising the migration to the second mode of operation. The controller or MCE may send the time indicator, for example.

Optionally, the time indicator may be generated by joining an IP multicast user plane data distribution group in order to receive SYNC packets that are also sent to the base station. The controller or MCE may generate the time indicator, for example.

According to a second aspect there is provided a system comprising:
  one or more base stations; and
  a controller configured to:
    receive information indicating the load of a base station from the one or more base stations;
    determine one or more groups of user equipment, UEs, engaged in a group call in a first mode of operation to be migrated to a second mode of operation based on the information indicating the load of the base station of the one or more base stations; and
    send a message indicating that the determined one or more groups of UEs are to migrate to the second mode of operation. The message may be sent to the base station, for example.

Optionally, the system of comprises a plurality of base stations.

Preferably, the system may further comprise an application server configured to receive requests from UEs to migrate to the second mode of operation. Therefore, the group call application server can administer group call configurations separate from the controller.

Preferably, the first mode of operation may be multicast and the second mode of operation may be unicast. However, the modes may migrate the other way, i.e. the first mode of operation may be unicast and the second mode of operation may be multicast.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 3:
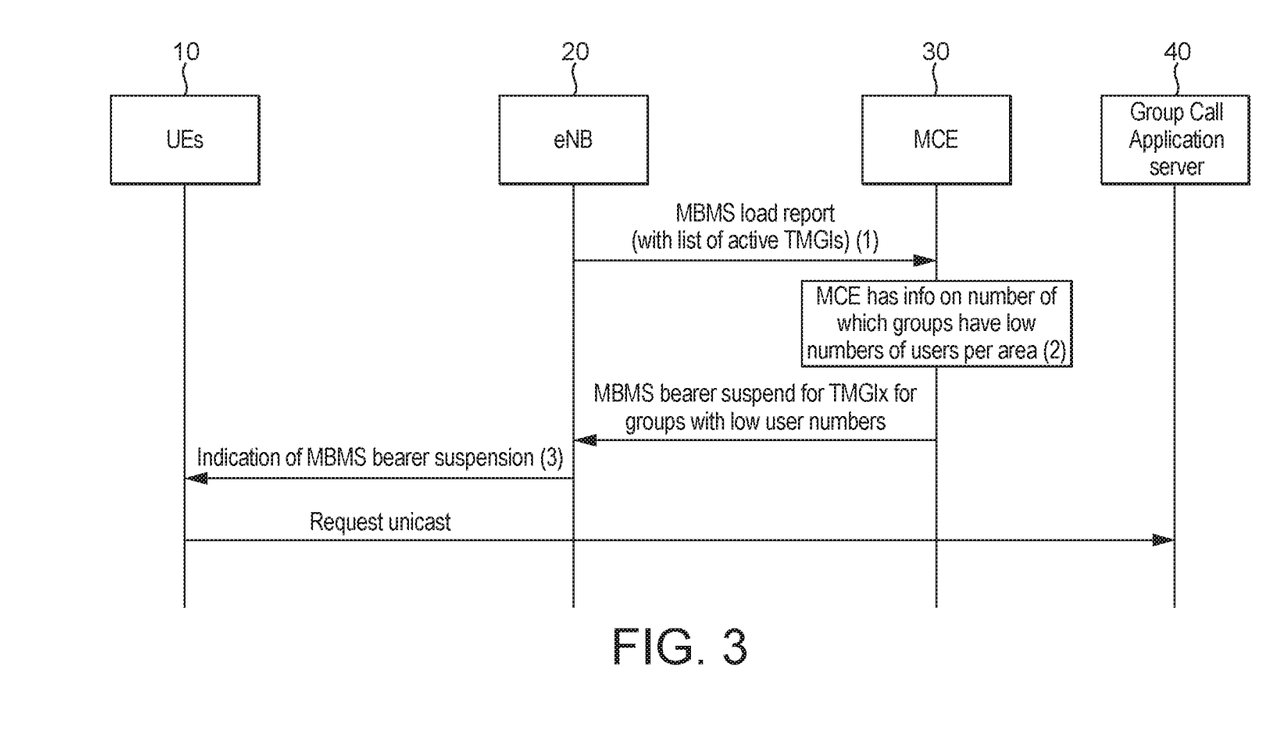
FIG. 3 shows a schematic diagram of a system and signalling flow of a method for managing communications resources within a cellular network, given by way of example only.

FIG. 3 shows an example architecture and signalling flow. UEs 10 within a group call may request to use a unicast mode of operation by signalling to a group call application server 40. Base station or eNode B (eNB) 20 may be one of many eNBs within the network and serve many UEs 10 both for group calls and other purposes. eNB 20 provides an indication of its load to controller or Multicell Coordination Entity (MCE) 30. This may be at regular intervals or triggered by certain loads or events. This could be above a predetermined percentage (e.g. 80%). This load report could also or instead provide an indication of utilisation of various resources including MBMS resources. Other information may be included in this load report including a list of temporary mobile group identities (TMGI) for which data is being transmitted and the UEs included in those groups and/or the number of UEs within each cell provided by the base station 20.

Therefore, the controller 30 may be able to determine information regarding groups that have a low number UEs in them and what mode they are operating in (multicast or unicast).

The controller 30 can migrate group calls to and from unicast and multicast operation. There are several mechanisms for doing so (indirectly and directly). In one embodiment the controller 30 may terminate a group call. This can be interpreted by the UEs 10 in those groups to re-establish communication in unicast mode by requesting this from the application server 40. Migrating group from unicast to multicast operation may be done conventionally using the MCCH scheduler (i.e. adding the TMGI to the scheduling information). What is not conventional is using the load information provided by the base station to make this decision.

Various components, enhancements or further embodiments may be used in isolation or in any combination.

Component 1: base station (eNB) 20 reports load situation (or the fact that there has been a failure of synchronisation of the user plane within the eNode B, or the fact that eMBMS hardware in the eNode B has failed) to controller (MCE) 30 together with active groups (TMGIs). The MCE 30 makes decision about switching to unicast per call group TMGI: The base station 20 may also or alternatively report when particular scenarios (e.g. 1 or 2 described below) occur. The information that may be reported to the MCE from eNode B may include:

Load has passed a threshold (which may be based on a signalled threshold by MCE 30 or preconfigured by operator) and would like some MBMS bearers to stop using the MBMS resource. The reported information may indicate "Current MBMSFN subframe utilization for the Physical eMBMS channel" (i.e. scenario 2 described below), and "Overload on Physical eMBMS channel" to fit more with scenario 1 described below).

Load has gone below a threshold (which may re-use the "Current MBMSFN subframe utilization for the Physical eMBMS channel" information above to indicate that the overload is now over.

Synchronisation of the eMBMS user plane has failed.

Hardware resources operating eMBMS have failed.

The service or group IDs (TMGIs) for which traffic is being generated.

Component 2: MCE 30 using counting reports from UE 10 via eNB 20 to optimise the offload to unicast decision (but needs cell ID in the M2 "Counting results" from eNode B: Current counting procedure can be used as specified in 3GPP TS36.331/TS36.443 to count how many users are interested in each service. However, currently the specification does not allow the MCE to know this information on a per cell level, just a per eNode B level.) In this embodiment the eNode B 20 indicates to the MCE 30 in counting reports the "number of users" per "cell" for each TMGI for which counting is requested. Additional information reported may be an "indication of whether all of the UEs in the talk group within the cell are within a small range of the Base Station". This additional information may enable the MCE to know whether this group can be handled efficiently by unicast even though there are a number of users in the group in the cell).

Component 3: Way to contact terminals more frequently than MCCH notification period to tell them to move to unicast (so that they do not have up to five seconds of service disruption): All of the solutions below would allow a faster communication to the terminal, such that it does not have a five second outage before it knows it needs to switch to unicast operation. Optimisation here may reduce service outage and may improve reliability and service continuity for terminals switching from MBMS to unicast operation. Note that when the service is switched from unicast to MBMS again, it can be assumed that the switch occurs close to the point where the MCCH is transmitted.

Unicast approaches: Upon instruction from MCE 30 that an MBMS bearer shall be suspended or interrupted, the eNode B 20 signals to the affected terminals 10 individually to inform them of this, and in some examples also that they should trigger unicast operation. The eNB 30 would need to keep track (via the "RRC MBMS counting procedure") which terminal is interested in which MBMS service, so that it knows which terminals to contact. Detailed example mechanisms follow:

Application packet approach: eNode B signals an application level packet to each affected terminal individually. The application packet is pre-stored in the eNode B.

Paging approach: New paging record is used to inform affected terminals individually.

Control channel signalling: Downlink control channel is used to inform affected terminals individually.

Broadcast approaches: Upon instruction from MCE that an MBMS bearer shall be suspended or interrupted, the eNode B signals to the affected terminals using MBMS channels to inform them of this collectively, and possibly also that they should trigger unicast operation. The MCE should provide some NEW information such as "time-stamp information" to the eNode B 20 so that each eNode B 20 knows when to send this information to UEs 10. This is needed to ensure that all eNode Bs in the MBSFN area send the information at the same time, such that the SFN operation is maintained.

Application packet sent on MBMS data channel to terminals: Like for the unicast approach the packet is pre-stored in the eNode B and sent when necessary. However, generated traffic may be increased at a point in time when the eNodeB 20 is trying to reduce MBMS traffic load.

Information provided in eMBMS scheduling information (provided at MAC layer) at the start of every MBMS scheduling period via a MAC message or MAC control element, advantageously a MCH Scheduling Information MAC Control Element.

Figure 4:
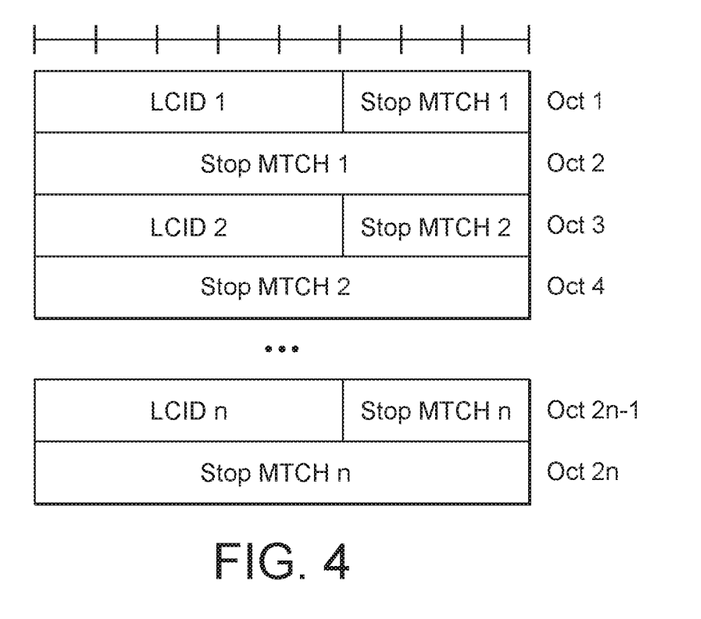
FIG. 4 shows a schematic diagram of a control message within a scheduling system.

In a particular example, the MCH Scheduling Information MAC Control Element illustrated in FIG. 4 is identified by a MAC PDU subheader with LCID. This control element has a variable size. For each MTCH the fields below are included:

LCID: this field indicates the Logical Channel ID of the MTCH. The length of the field is 5 bits;

Stop MTCH: this field indicates the ordinal number of the subframe within the MCH scheduling period, counting only the subframes allocated to the MCH, where the corresponding MTCH stops. Value 0 corresponds to the first subframe. The length of the field is 11 bits. The special Stop MTCH value 2047 indicates that the corresponding MTCH is not scheduled. The value range 2043 to 2046 is reserved.

One of the reserved code-points (e.g. 2046) may be used to indicate the fact that "the particular MBMS service is suspended/interrupted", and possibly that "the mobile(s) or UE(s) 10 should attempt a unicast operation for this service". This information may be coupled with the "bearer ID" (LCID in FIG. 4).

The use of the spare code-point would require that no MBMS data is sent for this same service within the scheduling period.

It may be useful to place this "LCID: stop MTCH" information-pair signalling with the new code-point used in the last position of the list of "LCID: stop MTCH" pairs within the MCH scheduling information element. The reason is that legacy terminals (who should ignore the reserved code-points if received) use the "stop MTCH" information from the previously signalled LCID to know when the data for the subsequent LCID starts, but if they do not understand the new code-point meaning, then they may get confused as to where the data for the next LCID starts. In addition, there could also be two instances of the "LCID: stopMTCH" pair for the same LCID value in the MSI message. This would allow the first instance to indicate that there are data scheduled for this TMGI within the scheduling period. The second instance would indicate that from the end of this scheduling period, the PTM bearer for this TMGI is suspended (and possibly that users should attempt to move to unicast operation). This has an advantage over a single instance as sending a stopMTCH value of (for example) "bearer suspended (and possibly go to unicast)" then in this same MSI message it may be difficult or impossible to also include an indication that there is user data scheduled on MTCH for this UE (as the legacy "stopMTCH" values are used to verify where the data is).

Figure 5:
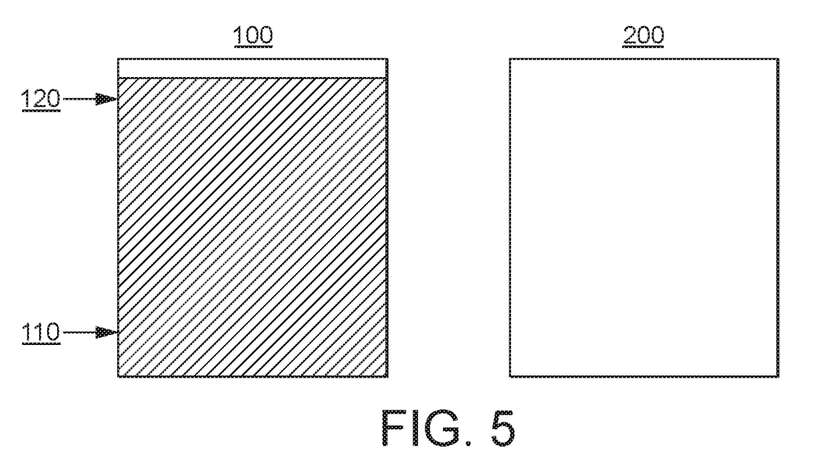
FIG. 5 shows a schematic diagram illustrating the utilisation of resources with the cellular network.

FIG. 5 shows schematically two MBMS resources 100, 200. A low threshold 110 and a high threshold 120 may be set or predetermined. The high threshold 120 may simply be when the resource is full or 100% utilised. In FIG. 5 this threshold is shown as being less than 100% utilisation. The shaded area in FIG. 5 indicates utilisation and so the first resource 100 is shown to exceed the high threshold 120. The utilisation of MBMS resources is notified to the controller 30 in the load report together with overall resource load information.

FIG. 5 therefore shows traffic levels approaching or exceed the capacity of MBMS resource 100. In this situation, the controller 30 will determine groups of UEs to switch to the unicast operation in order to avoid running into the second MBMS resource 200 (if it is available) or encountering service interruption. Typically, this will be those groups with low numbers of users or terminals. Even where resource 200 is available and free, then it can be advantageous to avoid using it at all (i.e. the overflow from resource 100) as this would mean that it is no longer available to UEs that can use multicast resources (such as MBMS resource 200), for unicast communication. Groups of UEs may be migrated back to multicast when utilisation drops below the threshold 120 or under other criteria.

Figure 6:
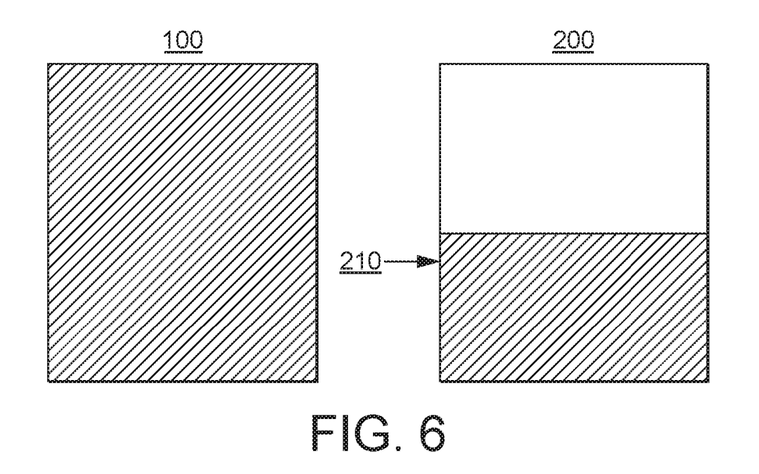
FIG. 6 shows a further schematic diagram illustrating the utilisation of resources with the cellular network.

FIG. 6 illustrates a situation where resource 100 is fully utilised and resource 200 is partially utilised by multicast groups. A further threshold 210 is illustrated in FIG. 6. As described with reference to FIG. 5, one option is to migrate the multicast groups using resource 200 over to unicast mode to free up this resource 200. However, when there are significant numbers of groups partially filling the resource (e.g. over particular threshold 210) then overuse of unicast mode may itself degrade performance of the base station or communications network as a whole. Therefore, an optimisation may occur by moving unicast groups to multicast mode even though their group membership number may be low (which would not optimise the network if done in isolation). This increases or fills up the utilisation of resource 200 (which may otherwise be under-utilised) and therefore may free up other resources of the base station for general non-group call use.

As will be appreciated by the skilled person, details of the above embodiment may be varied without departing from the scope of the present invention, as defined by the appended claims.

For example, embodiments of the invention have been described with reference to LTE but other network types may be used. Group calls may be voice calls or other data.

In a further example, a controller may be based at a particular base station. Optionally, the controller is a dedicated controller for that base station. Base station information is received by the controller, and the controller determines whether one or more groups of the UEs in communication with the base station should migrate from a first mode of operation to a second mode of operation (for example, from multicast to unicast operation). This determination may be based on information or data associated with the base station, such as the load of the base station. The determination for the given base station may take place on the basis of a number of preconfigured rules, without contact with another node or base station.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method of managing communication resources within a cellular network, the method comprising the steps of:
   determining one or more groups of user equipment, UEs, engaged in a Multimedia Broadcast and Multicast Service, MBMS, group call in a multicast mode of operation is to be migrated to a unicast mode of operation based on information indicating the load of a base station including information indicating the utilization of one or more MBMS resources, by determining that the one or more MBMS resource utilization is above a first threshold and responsive to determining that the one or more MBMS resource utilization is above the first threshold, migrating the determined one or more groups of UEs to unicast operation: and
   sending a message indicating that the determined one or more groups of UEs are to migrate to the unicast mode of operation.

2. The method of claim 1, wherein the message indicating that the determined one or more groups of UEs are to migrate to the unicast mode of operation is a cessation of the group call.

3. The method of claim 1 further comprising the steps of:
   UEs within the determined one or more groups of UEs receiving the message to migrate to the unicast mode of operation; and
   in response to the received message issuing a request to an application server to migrate to the unicast mode of operation.

4. The method of claim 1, wherein the base station provides a plurality of cells and wherein the information indicating the load of the base station comprises a load report further including a number of UEs per cell.

5. The method according to claim 1, wherein the message comprises a MAC control element.

6. The method of claim 1, wherein UEs within the determined one or more groups of UEs migrated to the unicast mode are capable of using a MBMS resource configured for multicast when no UEs in a multicast mode are using that MBMS resource.

7. The method according to claim 1, wherein the message indicating that the determined one or more groups of UEs are to migrate to the unicast mode of operation is sent by a LTE MAC control element.

8. The method of claim 7 wherein the MAC control element comprises two entries relating to each one or more groups of UEs and further wherein the first entry indicates that there are data scheduled for the group within a scheduling period and the second entry indicates that a bearer for the group is suspended or interrupted from the end of the scheduling period.

9. The method of claim 7, wherein the MAC control element comprises two entries relating to each one or more groups of UEs and further wherein the first entry indicates that there are data scheduled for the group within a scheduling period and the second entry indicates that the UEs are to switch to unicast.

10. The method according to claim 7, wherein the cellular network suspends or interrupts bearer for the group.

11. The method according to claim 1, further comprising receiving information indicating a number of UEs within each one or more groups of UEs, wherein the number is used to determine whether or not to migrate the determined one or more groups of UEs to the unicast mode of operation.

12. The method according to claim 1, further comprising the step of sending a time indicator for synchronizing the migration to the unicast mode of operation.

13. A system comprising:
   one or more base stations; and
   a controller configured to:
      receive information indicating the load of a base station from the one or more base stations, the information Indicating the utilization of one or more Multimedia Broadcast and Multicast Service, MBMS, resources;
      determine one or more groups of user equipment, UEs, engaged in a MBMS group call in a multicast mode of operation to be migrated to a unicast mode of operation based on the information indicating the load of the base station of the one or more base stations, by determining that the one or more MBMS resource utilization is above a first threshold and responsive to determining that the one or more MBMS resource utilization is above the first threshold, migrating the determined one or more groups of UEs to unicast operation; and
      send a message indicating that the determined one or more groups of UEs are to migrate to the unicast mode of operation.

14. The system of claim 13 further comprising an application server configured to receive requests from UEs to migrate to the unicast mode of operation.

* * * * *